G. D. ROSE.
FELLY CONSTRUCTION.
APPLICATION FILED JAN. 20, 1915.

1,257,125.

Patented Feb. 19, 1918.
2 SHEETS—SHEET 1.

WITNESSES.
M. E. McDade

INVENTOR
George D. Rose
by
James L. Norris
Attorney

UNITED STATES PATENT OFFICE.

GEORGE D. ROSE, OF MANCHESTER, ENGLAND.

FELLY CONSTRUCTION.

1,257,125.  Specification of Letters Patent.  Patented Feb. 19, 1918.

Application filed January 20, 1915. Serial No. 3,397.

*To all whom it may concern:*

Be it known that I, GEORGE DAUBNEY ROSE, a British subject, residing at Manchester, county of Lancaster, England, have invented certain new and useful Improvements in Felly Construction, of which the following is a specification.

The present invention relates to improvements in wheel fellies, and it proposes, briefly, the production of an article of the general class or character specified which, by reason of its peculiar construction, and of the particular material of which it is made, is especially well adapted for use in building up the wheels of heavy road vehicles such as trucks or lorries.

Wheel fellies, as is generally known, are ordinarily constructed of solid wooden strips or the like; but the practical utility of fellies of that type is necessarily influenced, to some extent at least, by prevailing atmospheric and climatic conditions, this being particularly true of certain European countries, especially England, where wooden felly wheels are seriously affected by changes in temperature, dryness and moisture, and must be sent at frequent intervals to the wheelwright for tightening and resetting of their steel bands or rims.

It is the essential purpose of my invention to overcome this defect or difficulty, by providing a felly as distinct from a tire that is made up of a basic material which is wholly unaffected by climatic and atmospheric changes and, in consequence, is not subject to expansion and contraction therefrom, and which is of such a character as to constantly tend to maintain its original position or shape, with the result that a felly, when constructed as hereinafter described, and in place on the finished wheel, will impose an outward pressure radially against the steel rim at all points thereof, thus holding the latter tight at all times by immediately taking up any slack which may arise from any cause.

According to the invention, the felly is built up of coir or cocoanut fiber or yarn, which has a peculiarly spring nature, this fiber, in one form or another, being arranged in superposed layers which are bound together by a vulcanizable material and subjected to heat and high pressure in a mold. The parts of the wheel are then assembled in a wheel press, and the steel rim shrunk on the felly, during which time the latter is subjected to a further compression.

Referring to the accompanying drawing.

Figure 3:
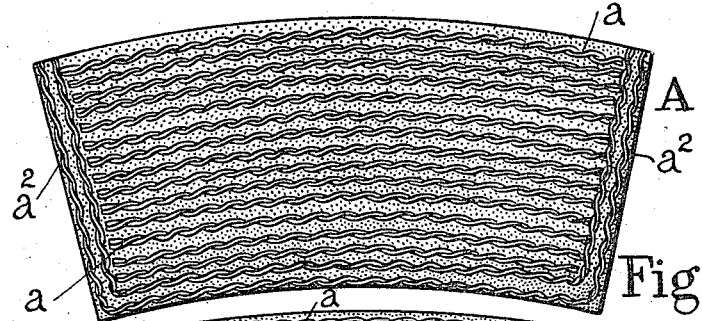
Figs. 3, 4 and 5 are longitudinal sectional views of various forms of blocks or members forming the felly.
Figure 4:
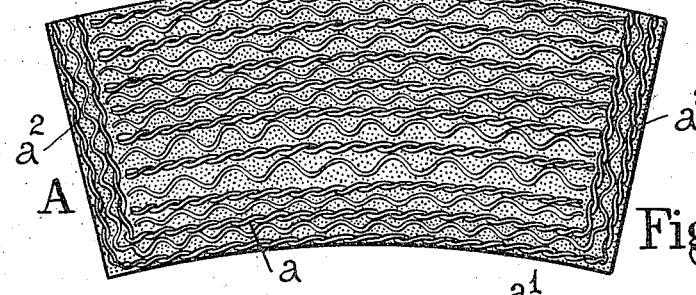

In carrying out the invention, coir fiber or yarn, commonly known as cocoanut matting, is cut or woven into strips $a$ of suitable length and width to form one of the segmental blocks or members A of which the felly is composed. The block A is built up of layers of these strips $a$ of woven coir yarn, laid one upon another as shown in Figs. 3 and 4, each layer alternating with a layer of rubber or other vulcanizable gum or material. Some of the strips $a$ are woven with the selvages at the side, and some with the selvages at the end, and the strips may be so arranged that the selvages come to the sides and ends of the blocks alternately; or, if preferred, so that the warp yarns of the successive layers run alternately longitudinally and transversely of the block, in which event the warp yarns of one layer will cross those of the next layer, as represented in Fig. 4. It is also preferable, in building up the block, to extend one or more of the lower layers at their ends, and to fold or lap over the extended portions $a^2$, so as to impart a more finished appearance to the block ends.

Figure 5:
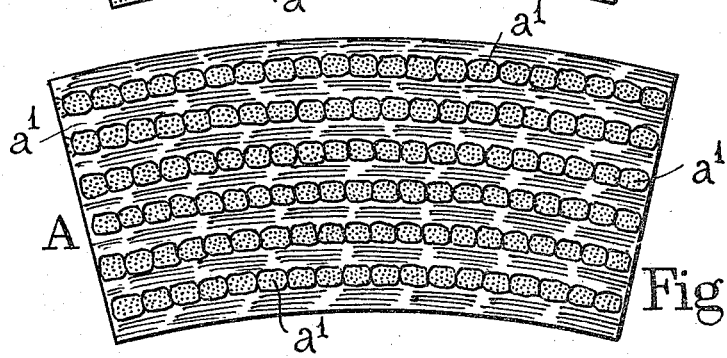

Instead of utilizing woven coir fabric, the blocks may be built up in a similar manner of separate strands or hanks $a'$ of coir yarn (Fig. 5), laid alternately endwise and crosswise of the blocks; and in place of the single woven strips or layers of fabric, a number of layers of the fabric may be woven together in a manner similar to that followed in the manufacture of what is known as solid woven belting, where several plies are woven together in a loom. In any case, however, the strands, strips or layers of coir are bound together by the rubber or other vulcanizable material, which is preferably laid between each layer or strand in the form of a thin sheet or granulated layer.

Figure 1:
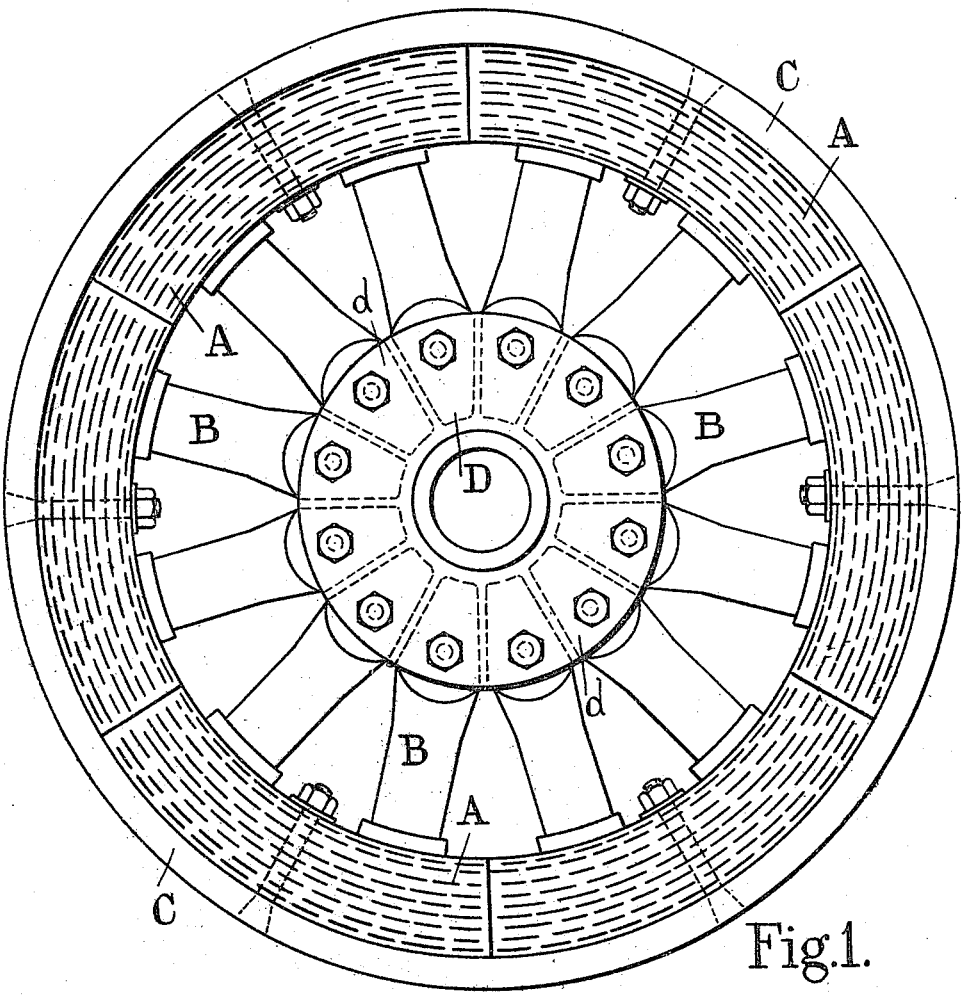
Figure 1 is a side elevation of a lorry wheel equipped with the improved felly.
Figure 2:
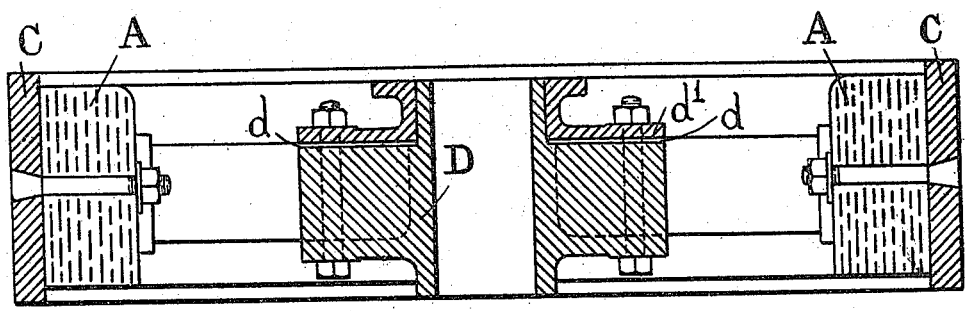
Fig. 2 is a central, transverse section thereof.
Figure 6:
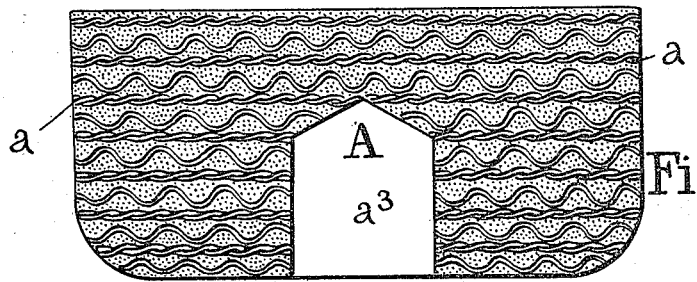
Fig. 6 is a transverse sectional view of one form of block.

The blocks, constructed as above described, are compressed in suitable molds or dies under great pressure, in a radial direction, heat being applied at the same time, so as to effect the vulcanization of the rubber and thereby form a homogeneous mass. Each block is constructed and compressed separately. When compressed and finished, the blocks are bored at $a^3$ (Fig. 6) to take the ends of the spokes B; though they may, if desired, be molded with these spoke-seats. Thereafter, the parts of the wheel are assembled in a wheel press, in the usual manner, with the blocks encircled by the metal rim C, and the inner ends of the spokes secured in sockets $d$ in the hub D by a hub plate $d'$, (Figs. 1 and 2). The blocks are subjected to further pressure while in the wheel press, as will be understood, the pressure applied preferably being even greater than that imposed upon them during molding. Consequently, the fibers of the blocks are ultimately compressed to the limit of their compressibility, so that no further compression thereof can be effected by the working load upon the wheel.

The finished wheel has the great advantage over the ordinary wooden felly wheel that the component blocks or segments of the felly have the constant tendency to move radially outward, or, in other words, constantly exert an outward pressure against the metal rim or band C, which latter may either constitute the tire of the wheel or may serve merely as a carrier for a conventional resilient or pneumatic tire. This outward pressure of the aforesaid blocks is due to the inherent resiliency of the coir and its expansive tendency produced consequent upon the compression to which it is subjected, and it has the effect of immediately taking up any slackness in the band C which may or otherwise would have arisen for any cause, so that constant or repeated re-tightening of said band is wholly avoided. Furthermore, the improved felly is extremely durable, owing to the natural toughness of the coir; and, since the felly is not subject to expansion and contraction, it will not be affected by atmospheric and climatic conditions, so that its wearing qualities and effective life are correspondingly increased and prolonged.

I claim as my invention—

1. A felly for wheel tires, composed of layers of coir yarn bound together by a substance vulcanized under pressure into a resilient, homogeneous body in such a state of compression that it constantly tends both to return in a radial direction to its original shape when distorted therefrom, and to take up slack in the tire of the wheel by imposing an outward pressure thereagainst.

2. A felly for wheel tires, composed of superposed strips of woven coir yarn bound together by a substance vulcanized under high pressure into a resilient, homogeneous body in such a state of compression that it constantly tends both to return in a radial direction to its original shape when distorted therefrom, and to take up slack in the tire of the wheel by imposing an outward pressure thereagainst.

3. A felly for wheel tires, consisting of segmental blocks or sections arranged in endwise-abutting relation to form a closed ring; each of said blocks or sections being composed of coir yarn bound together by a substance vulcanized under pressure into a resilient, homogeneous body in such a state of compression that the felly is caused to constantly tend to return in a radial direction to its original shape when distorted therefrom, and to take up slack in the tire of the wheel by imposing an outward pressure thereagainst.

4. A felly for wheel tires, consisting of segmental blocks or sections arranged in endwise-abutting relation to form a closed ring; each of said blocks or sections being composed of superposed strips of woven coir yarn bound together by a substance vulcanized under pressure into a resilient, homogeneous body in such a state of compression that the felly is caused to constantly tend to return in a radial direction to its original shape when distorted therefrom, and to take up slack in the tire of the wheel by imposing an outward pressure thereagainst.

5. A felly for wheel tires, consisting of segmental blocks or sections arranged in endwise-abutting relation to form a closed ring; each of said blocks or sections being composed of superposed strips of woven coir yarn disposed so that their selvages come to the sides and ends of the blocks or sections alternately and the warp threads of successive strips cross each other; said strips being bound together by a substance vulcanized under pressure into a resilient, homogeneous body in such a state of compression that the felly is caused to constantly tend to return in a radial direction to its original shape when distorted therefrom, and to take up slack in the tire of the wheel by imposing an outward pressure thereagainst.

6. A felly for wheel tires, consisting of segmental blocks or sections arranged in endwise-abutting relation to form a closed ring; each block or section being composed of superposed layers of coir fabric bound together by a substance vulcanized under pressure into a resilient, homogeneous body, certain of the lower layers being extended and folded upwardly against the ends of the block.

In testimony whereof I have hereunto set my hand in presence of two subscribing witnesses.

GEORGE D. ROSE.

Witnesses:
I. OWDEN O'BRIEN,
T. W. ANDREW.